(12) United States Patent
Choo et al.

(10) Patent No.: US 6,504,673 B2
(45) Date of Patent: Jan. 7, 2003

(54) ASYMMETRICAL DISC CLAMP

(75) Inventors: Victor Chi Siang Choo, Singapore (SG); Poh Lye Lim, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 152 days.

(21) Appl. No.: 09/728,344

(22) Filed: Dec. 1, 2000

(65) Prior Publication Data

US 2002/0067569 A1 Jun. 6, 2002

Related U.S. Application Data

(60) Provisional application No. 60/193,685, filed on Mar. 31, 2000.

(51) Int. Cl.[7] .............................................. G11B 25/04
(52) U.S. Cl. ................................... 360/98.08; 360/99.12
(58) Field of Search ........................... 360/98.08, 99.12

(56) References Cited

U.S. PATENT DOCUMENTS

| | | | |
|---|---|---|---|
| 4,561,035 A | 12/1985 | McDorman et al. | |
| 5,130,870 A | 7/1992 | Jabbari | |
| 5,333,080 A | 7/1994 | Ridinger et al. | |
| 5,537,272 A | * 7/1996 | Kazmierczak et al. | ... 360/99.08 |
| 5,555,144 A | 9/1996 | Wood et al. | |
| 5,572,382 A | 11/1996 | Kuno | |
| 5,761,002 A | 6/1998 | Moir et al. | |
| 5,790,345 A | 8/1998 | Alt | |
| 5,877,571 A | 3/1999 | Brooks | |
| 5,907,458 A | * 5/1999 | Choi | |
| 6,288,867 B1 | * 9/2001 | Jierapipatanakul et al. | ...... 360/98.08 |

FOREIGN PATENT DOCUMENTS

JP          62-289984        * 12/1987

* cited by examiner

*Primary Examiner*—Craig A. Renner
(74) *Attorney, Agent, or Firm*—Derek Berger

(57) ABSTRACT

The present invention provides a disc clamp for use with a disc stack assembly where the disc stack assembly is designed for rotation about an axis. The disc clamp includes a set of openings defined by a body, such that each opening has line symmetry about a line of reflection that intersects the axis. The disc clamp also includes a set of flanges, each which extends from the body into one of the openings. The disc clamp is made such that the set of openings has rotational symmetry about the axis and the set of flanges is rotationally asymmetrical about the axis.

12 Claims, 3 Drawing Sheets

ASYMMETRICAL DISC CLAMP

RELATED APPLICATION

The present application claims benefit of the U.S. provisional patent application No. 60/193,685, filed Mar. 31, 2000.

FIELD OF THE INVENTION

The present invention relates generally to disc drives. More particularly, the present invention relates to a method and apparatus for balancing a disc stack assembly of a disc drive.

BACKGROUND OF THE INVENTION

In a typical disc drive, data storage or retrieval involves positioning a read/write head over the relevant disc surface when the disc is spinning. The discs are therefore mounted on a spindle motor, one disc on top of another, separated by spacers, to form a disc stack assembly.

It is important to provide a suitable disc clamp to secure the various components of the disc stack assembly so that the components remain in alignment to each other under high speed rotation, and even in the presence of a high external shock. Ideally, a disc clamp should provide the required clamping forces on a disc evenly so as to minimize disc warpage. Accordingly, disc clamps are generally designed to be rotationally symmetrical.

As the disc stack assembly is required to rotate at high speeds, it is also essential to minimize any imbalance so as to avoid excessive vibrations. Imbalance in a disc stack assembly can result in track mis-registration and erratic speed variations, which in turn causes read/write errors.

One method of correcting imbalance involves fixing the discs so that they are alternately shifted in diametrically opposite directions, as disclosed in the U.S. Pat. No. 4,683,505 issued Jul. 28, 1987 to Schmidt et al. This method is however not suitable for use with disc stack assemblies having only one disc or an odd number of discs.

Another method of correcting imbalance involves mounting an additional component to the disc stack assembly so as to provide a counter-balancing weight. For example, in the U.S. Pat. No. 5,555,144 issued Sep. 10, 1996, Wood et al. discloses the use of a C-shaped balancing clip which can be added to the disc stack assembly and positioned in an appropriate orientation to provide the desired counter-balance. Alternatively, the counter-balance may be introduced by the use of a spacer ring which has part of its edge machined off so that its center of gravity is offset from the center of the spacer ring. Generally, it is desirable to reduce the number of components so as to improve manufacturing efficiency. Therefore, in cases where there is only one disc in the disc stack assembly and spacers are not required, it is preferred if the use of such a spacer ring can be avoided.

The present invention provides a solution to this and other problems, and offers other advantages over the prior art.

SUMMARY OF THE INVENTION

The present invention relates to a disc drive component which incorporates two seemingly incompatible functions of clamping a disc stack assembly and balancing the disc stack assembly.

The disc stack assembly is designed to rotate about an axis of rotation. When the disc clamp is secured to the spindle motor at the one or more attachment points so that the center of the disc clamp substantially coincides with the axis of rotation, and clamping forces are exerted on the disc stack assembly. The various components of the disc stack assembly can thus be clamped in fixed position relative to one another. The disc clamp includes two or more openings, one or more of which has a flange extending into the opening. The number of flanges, and the size and shape of each flange are varied such that the center of gravity of the disc clamp is offset from the center of the disc clamp. The arrangement is such that, disregarding the flanges, the disc clamp has rotational symmetry about the center, but taking the flanges into consideration, the disc clamp is rotationally asymmetrical about the center.

Traditionally, it is expected that a disc clamp that does not have rotational symmetry will exert uneven clamping forces and therefore cause disc warpage. Therefore, conventional balancing methods have been limited to the use of other additional components to provide the counter-balancing weight to the disc stack assembly, and conventional disc clamps are designed to have rotational symmetry. The disc clamp of the present invention is however able to provide a counter-balancing weight to a disc stack assembly while at the same time provides an evenly distributed clamping force.

These and various other features as well as advantages which characterize the present invention will be apparent upon reading of the following detailed description and review of the associated drawings.

DETAILED DESCRIPTION

Figure 1:
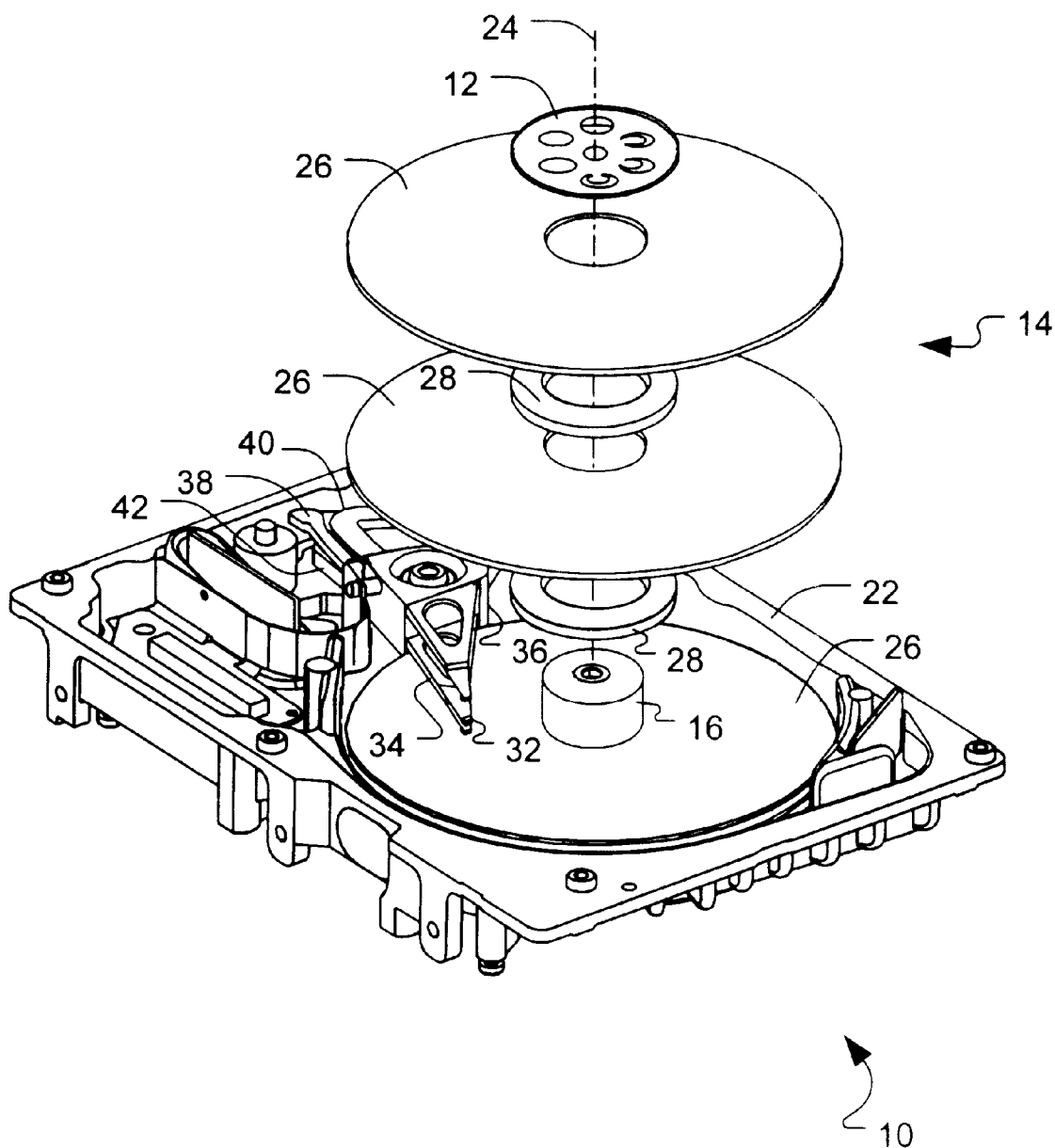
FIG. 1 is an isometric view of a disc drive.

According to the present invention, a disc drive 10 includes a disc clamp 12 for use with a disc stack assembly 14 such that the disc clamp 12 also act as a balancing counterweight to the disc stack assembly 14. One example of such a disc drive 10 is shown in FIG. 1. The disc stack assembly 14 is securely mounted on a spindle motor. The spindle motor 16 includes a stator and a rotor. The stator is fixedly mounted to the disc drive casing 22. The disc stack assembly 14 is fixed to the rotor for rotational motion about an axis of rotation 24. The disc stack 14 may include one or more flat annular discs 26, on which surfaces data can be stored. Where the disc stack 14 includes more than one disc 26, the discs 26 are kept spaced apart by the use of an appropriate number of spacers 28. The disc clamp 12 is secured to the rotor such that it provides clamping forces on the disc stack assembly 14 and thus keeps the various components of the disc stack assembly 14 in fixed position relative to one another.

Data is usually recorded in tracks on the disc surfaces. During disc drive operations, the disc stack assembly 14 is rotated and read/write heads 32 are controllably moved to the desired track for the read/write operations. The read/write heads 32 are supported at the end of one or more actuator arms 34 for such controlled movement across the corresponding disc surfaces. The actuator arms 34 extend from one side of a pivoting actuator body 36 while a yoke 38 extends from the other side of the actuator body 36. The yoke 38 supports a voice coil 40 over a magnet 42 to form part of a voice coil motor that controls the movement of the actuator arms 34.

Figure 2:
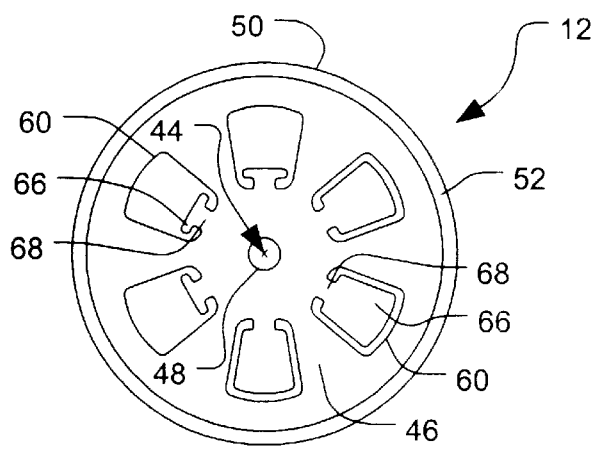
FIG. 2 shows a bottom view of a disc clamp according to a preferred embodiment of the invention.

A most preferred embodiment of the disc clamp 12 is shown in greater detail in FIG. 2. The disc clamp 12 is designed so that the center 44 of its body 46 is meant to coincide with the axis of rotation 24 of the spindle motor 16 when the disc clamp 12 is fixed to the rotor. The body 46 includes a hole 48 at the center 44 for screw attachment to the rotor. The body 46 is substantially flat with an upturned outer edge 50 which forms a convex rim 52 on the bottom surface of the disc clamp. In assembly, the bottom surface of the disc clamp faces the disc stack assembly and the rim 52 provides for a substantially circular line of contact with the disc stack assembly 14.

The body 46 of the disc clamp 12 defines a set of six openings 58. The openings 60 are regularly distributed in a radial array about the center 44 of the disc clamp 12. The openings 60 are of the same size and shape, each having line symmetry about an axis of reflection 62 which intersects the center 44 of the disc clamp 12. The body 46 further includes a set of flanges 64. Each flange 66 extends from one side of an opening 60 so that the flange 66 is located within the opening 60. The flanges 66 are of two sizes; three of the flanges are of a larger size and another three are of a smaller size. Each of the larger flanges 66 has a shape similar to that of an opening 60, but is smaller than the opening 60. Each flange 66 includes a stem 68 which is narrower than the flange 66. The stem 68 joins the flange 66 to the edge of the corresponding opening 60. The flanges 66 are arranged so that the three larger flanges 66 are located in three neighboring openings 60 and the three smaller flanges 66 are located in the other three neighboring openings 60.

Figure 3:
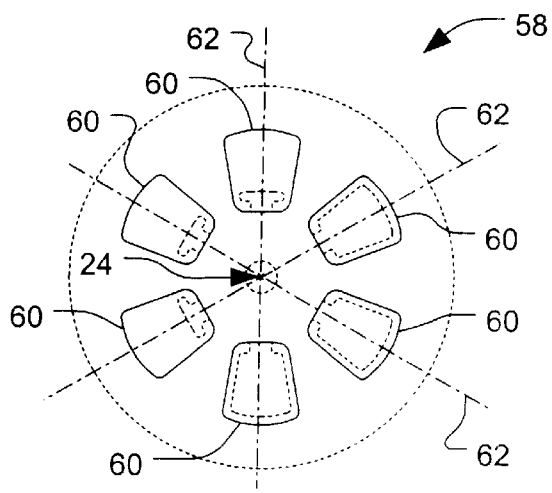
FIG. 3 is a diagram illustrating the set of openings in the body of the disc clamp.
Figure 4:
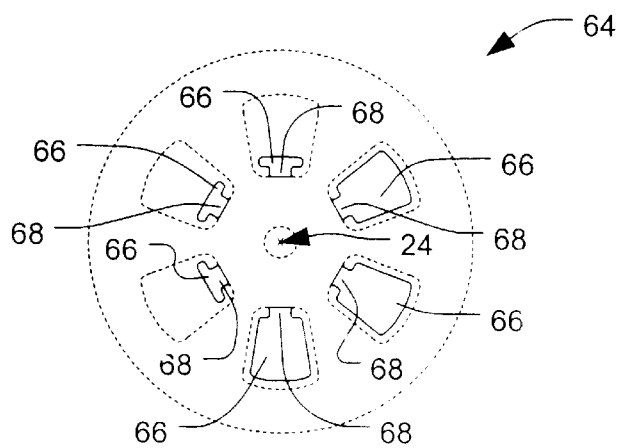
FIG. 4 is a diagram illustrating the set of flanges.

FIG. 3 diagrammatically illustrates the set of openings 58 in relation to the center 44 of the disc clamp 12 or the axis of rotation 24. The set of openings 58 can be seen have rotational symmetry about the center 44 of the disc clamp 12 or in other words, about the intended axis of rotation 24. If the flanges 66 are disregarded, the disc clamp 12 is rotationally symmetrical about its center 44. FIG. 4 shows a similar diagram for the set of flanges 64. The set of flanges 64 is rotationally asymmetrical about the center 44 of the disc clamp 12, or about the intended axis of rotation 24.

Figure 5:
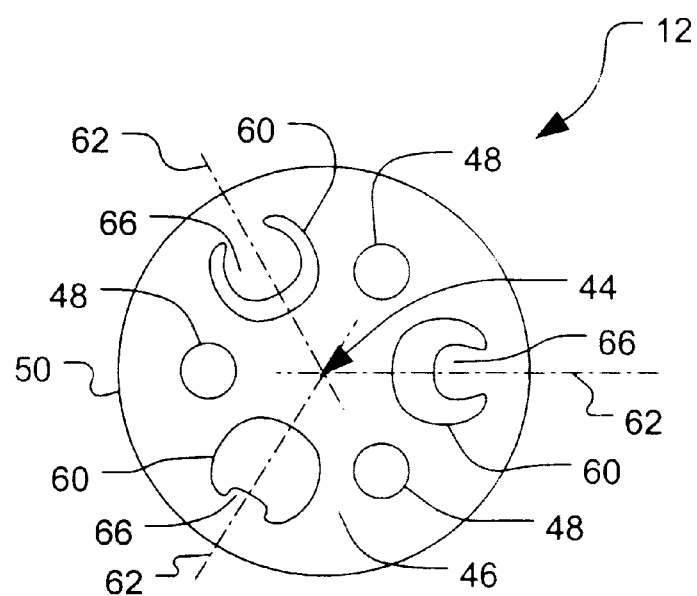
FIG. 5 shows another embodiment of the disc clamp.

It is within the scope of the present invention to vary the size, the shape and the number of the openings 60, as well as of the flanges 66 so that the disc clamp 12 as a whole provides the desired counter-balancing effect with the required clamping forces. For example, the disc clamp 12 may be designed for attachment to the spindle motor 16 at more than one point. A disc clamp 12 of the present invention is shown in FIG. 5 with three attachment holes 48 for screw attachment to the rotor. Alternative methods of attachment, other than the use of screws may be used, depending on the design requirements of the disc drive 10. The distribution of the attachment holes 48 and the openings 60 is such that, disregarding the flanges 66, the disc clamp 12 has rotational symmetry about its center 44. The flanges 66 are shown here to extend into the openings 60 from the sides of the openings nearer to outer edge 50. The flanges 66 are not limited to only two sizes, neither are they limited to having shapes similar to that of the openings. In this example, the flanges 66 do not include stems.

Figure 6:
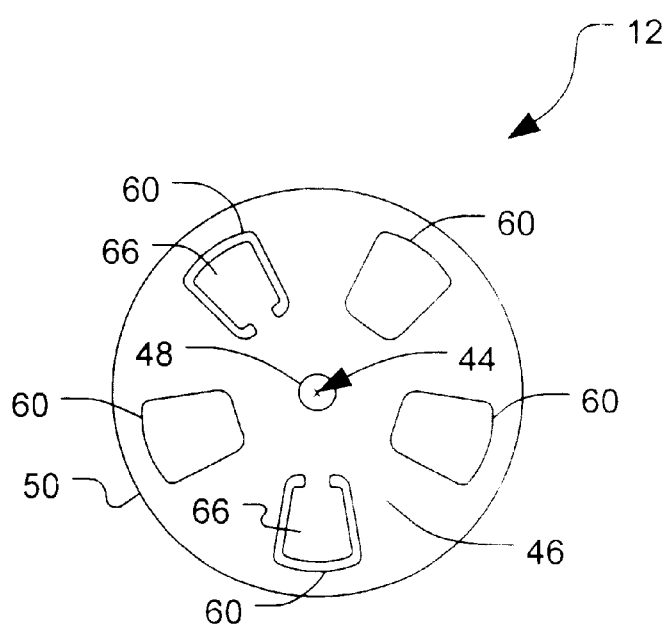
FIG. 6 shows yet another embodiment of the disc clamp.

Another embodiment of the disc clamp is shown in FIG. 6. In this example, some of the openings 60 do not have a flange 66 located therein, and all the flanges 66 are of the same size and shape. The example further illustrates that the total number of openings 60 may vary.

The disc clamp 12 of the present invention may be used with disc stacks 14 which have one or more discs 26. It is especially suited for use with disc stacks 14 having an odd number of discs 26 in conjunction with the balancing method of alternately shifting the discs 26 in diametrically opposite directions. In a disc drive where the disc stack 14 includes only one disc 26, the present invention provides the advantage that an additional balancing spacer or balancing ring will not be required. A reduction in the number of components required to complete the disc drive assembly tends to reduce manufacturing costs, and is an important advantage provided by the present invention. In addition, a disc clamp 12 of the present invention can also be used with disc stacks 14 having an even number of discs 26, simply by varying the configuration of the disc clamp 12 to produce the desired direction and amount of counter-balance.

Alternatively, embodiments of the present invention may be described as follows:

A disc clamp 12 of the present invention is intended for use with a disc stack 14 that is designed for rotation about an axis 24. The disc clamp 12 is formed with a set of openings 58 defined by a body 46. The set of openings 58 includes at least two openings 60. Each opening 60 has line symmetry about a line of reflection 62 that intersects the axis 24. The disc clamp 12 also includes set of flanges 64. The set of flanges 64 includes at least one flange 66. Each flange 66 extends from the body 46 of the disc clamp 12 into one of the openings 60. The disc clamp 12 is made such that the set of openings 58 has rotational symmetry about the axis 24 and the set of flanges 64 is rotationally asymmetrical about the axis 24.

The disc clamp 12 may have a rim 52 that is configured to provide a substantially circular line of contact with the disc stack 14. The openings 60 in the disc clamp 12 preferably have substantially the same shape and size. Each flange 66 may be attached to the body 46 by a stem 68 where the stem 68 is formed narrower than the flange 66. At least one of the flanges 66 may be similar in shape to one of the openings 60. Where the set of flanges 64 comprises at least two flanges 66, at least one of the flanges 66 may be relatively larger than another flange 66.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the disc clamp may have as few as one flange while maintaining substantially the same functionality without departing from the scope and spirit of the present invention.

What is claimed is:

1. A disc clamp for use with a disc stack, the disc stack being configured for rotation about an axis, the disc clamp comprising:
   a body;
   a set of openings defined by the body, the set of openings comprising at least two openings, each one of the openings having line symmetry about a line of reflection that intersects the axis; and a set of flanges comprising at least one flange, each one of the flanges extending from the body into one of the openings, wherein the set of openings has rotational symmetry about the axis and wherein the set of flanges is rotationally asymmetrical about the axis.

2. A disc clamp of claim 1 wherein the body further comprises a rim configured to provide a substantially circular line of contact with the disc stack.

3. A disc clamp of claim 1 wherein the openings have substantially the same shape and size.

4. A disc clamp of claim 3 wherein each flange is attached to the body by a stem, and wherein the stem is narrower than the flange.

5. A disc clamp of claim 3 wherein at least one flange is similar in shape to one of the openings.

6. A disc clamp of claim 3 wherein the set of flanges comprises at least two flanges, and wherein at least one of the flanges is relatively larger than at least another one of the flanges.

7. A disc drive comprising:
 a spindle motor having a rotor configured for rotation about an axis;
 a disc stack mounted on the rotor, the disc stack comprising at least one disc; and
 a disc clamp fixed to the rotor such that it applies clamping forces to the disc stack, the disc clamp comprising:
  a body;
  a set of openings defined by the body, the set of openings comprising at least two openings, each one of the openings having line symmetry about a line of reflection that intersects the axis; and
  a set of flanges comprising at least one flange, each one of the flanges extending from the body into one of the openings, wherein the set of openings has rotational symmetry about the axis and wherein the set of flanges is rotationally asymmetrical about the axis.

8. A disc drive of claim 7 wherein the body further comprises a rim configured to provide a substantially circular line of contact with the disc.

9. A disc drive of claim 7 wherein the openings have substantially the same shape and size.

10. A disc drive of claim 9 wherein each flange is attached to the body by a stem, and wherein the stem is narrower than the flange.

11. A disc drive of claim 9 wherein at least one flange is similar in shape to one of the openings.

12. A disc drive of claim 9 wherein the set of flanges comprises at least two flanges, and wherein at least one of the flanges is relatively larger than at least another one of the flanges.

* * * * *